(12) United States Patent
Thirumalai et al.

(10) Patent No.: US 10,986,360 B2
(45) Date of Patent: Apr. 20, 2021

(54) VARIOUS IMPROVEMENTS TO FRUC TEMPLATE MATCHING

(71) Applicant: QUALCOMM Incorporated, San Diego, CA (US)

(72) Inventors: Vijayaraghavan Thirumalai, Fremont, CA (US); Xiang Li, Los Gatos, CA (US); Nan Hu, San Diego, CA (US); Hsiao-Chiang Chuang, San Diego, CA (US); Marta Karczewicz, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 85 days.

(21) Appl. No.: 16/159,458

(22) Filed: Oct. 12, 2018

(65) Prior Publication Data

US 2019/0124350 A1 Apr. 25, 2019

Related U.S. Application Data

(60) Provisional application No. 62/573,115, filed on Oct. 16, 2017.

(51) Int. Cl.
*H04N 19/537* (2014.01)
*H04N 19/543* (2014.01)
(Continued)

(52) U.S. Cl.
CPC .......... *H04N 19/513* (2014.11); *H04N 19/44* (2014.11); *H04N 19/46* (2014.11); *H04N 19/52* (2014.11);
(Continued)

(58) Field of Classification Search
CPC .......................... H04N 19/537; H04N 19/543
See application file for complete search history.

(56) References Cited

U.S. PATENT DOCUMENTS

| 2015/0195566 A1* | 7/2015 | Hinz | H04N 19/107 375/240.13 |
|---|---|---|---|
| 2017/0238011 A1* | 8/2017 | Pettersson | H04N 19/85 375/240.12 |

(Continued)

FOREIGN PATENT DOCUMENTS

WO 2018163858 A1 9/2018

OTHER PUBLICATIONS

Alshina, Elena & Sullivan, Gary & Ohm, Jens-Rainer & Boyce, Jill. (2018). JVET-G1001: Algorithm description of Joint Exploration Test Model 7 (JEM7). available at https://mpeg.chiariglione.org/standards/exploration/future-video-coding/n17055-algorithm-description-joint-exploration-test-model (Year: 2017).*

(Continued)

*Primary Examiner* — Jeremiah C Hallenbeck-Huber
(74) *Attorney, Agent, or Firm* — Espartaco Diaz Hidalgo

(57) ABSTRACT

A device for video decoding may include a memory configured to store video data and a processor configured receive a bitstream including encoded video data. The processor may be configured to select a number of template matching (TM) candidates for a temporal layer or slice during the video decoding. The number of TM candidates selected are fixed prior to the video decoding, or adaptively calculated during the video decoding. The processor may be configured to generate a prediction block and residual block, based on a template matching candidate, to reconstruct the video data.

18 Claims, 14 Drawing Sheets

(51) Int. Cl.
  H04N 19/513   (2014.01)
  H04N 19/46    (2014.01)
  H04N 19/44    (2014.01)
  H04N 19/56    (2014.01)
  H04N 19/70    (2014.01)
  H04N 19/577   (2014.01)
  H04N 19/52    (2014.01)
  H04N 19/85    (2014.01)

(52) U.S. Cl.
  CPC ........... *H04N 19/537* (2014.11); *H04N 19/56* (2014.11); *H04N 19/577* (2014.11); *H04N 19/70* (2014.11); *H04N 19/85* (2014.11)

(56) References Cited

U.S. PATENT DOCUMENTS

| | | | | |
|---|---|---|---|---|
| 2018/0041762 | A1* | 2/2018 | Ikai | H04N 19/597 |
| 2019/0007699 | A1* | 1/2019 | Liu | H04N 19/513 |
| 2019/0014342 | A1* | 1/2019 | Li | H04N 19/159 |
| 2019/0045188 | A1* | 2/2019 | Mahdi | H04N 19/122 |

OTHER PUBLICATIONS

Wang, Ye-Kui & Sullivan, Gary & Bross, Benjamin; "High Efficiency Video Coding (HEVC) Defect Report 2"; JCTVC_O1003_v1; avialable at https://mpeg.chiariglione.org/standards/mpeg-h/high-efficiency-video-coding/defect-report-23008-2201x (Year: 2013).*

Chen J., et al., "JVET-G1001—Algorithm Description of Joint Exploration Test Model 7 (JEM7)", Joint Video Exploration Team (JVET)OF ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: https://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2.

Christos G., et al., "Beyond the High Efficiency Video Coding Standard: An Overview", Proceedings of SPIE; [Proceedings of SPIE ISSN 0277-786X vol. 10524], SPIE, US, vol. 10223, May 1, 2017 (May 1, 2017), pp. 102230F-1-102230F-18, XP060089254, DOI: 10.117/12.2261109, ISBN: 978-1-5106-1533-5.

International Search Report and Written Opinion—PCT/US2018/055933—ISA/EPO—dated May 15, 2019.

Robert A., et al., "EE3-JVET-D0046: High Precision FRUC with Additional Candidates", 5. JVET Meeting; Jan. 12, 2017-Jan. 20, 2017; Geneva; (The Joint Video Exploration Team of ISO/IEC JTC1/SC29/WG11 and ITU-T SG.16); URL:http://phenix.int-evry.fr/jvet/,, No. JVET-E0060, Jan. 3, 2017 (Jan. 3, 2017), XP030150539, 11 Pages.

Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI:10.1109/TCSVT.2012.2221191, pp. 1649-1668, p. 1662, Paragraph 3) Merge Mode.

Wang Y.K., et al., "High Efficiency Video Coding (HEVC) Defect Report", 14. JCT-VC Meeting, Jul. 25, 2013-Aug. 2, 2013, Vienna, Joint Collaborative Team on Video Coding of ISO/IEC JTC1/SC29/WG11 and ITU-TSG.16, URL: http://wftp3.itu.int/av-arch/jctvc-site/,, No. JCTVC-N1003, Sep. 27, 2013 (Sep. 27, 2013), pp. 89-94, XP002787691.

\* cited by examiner

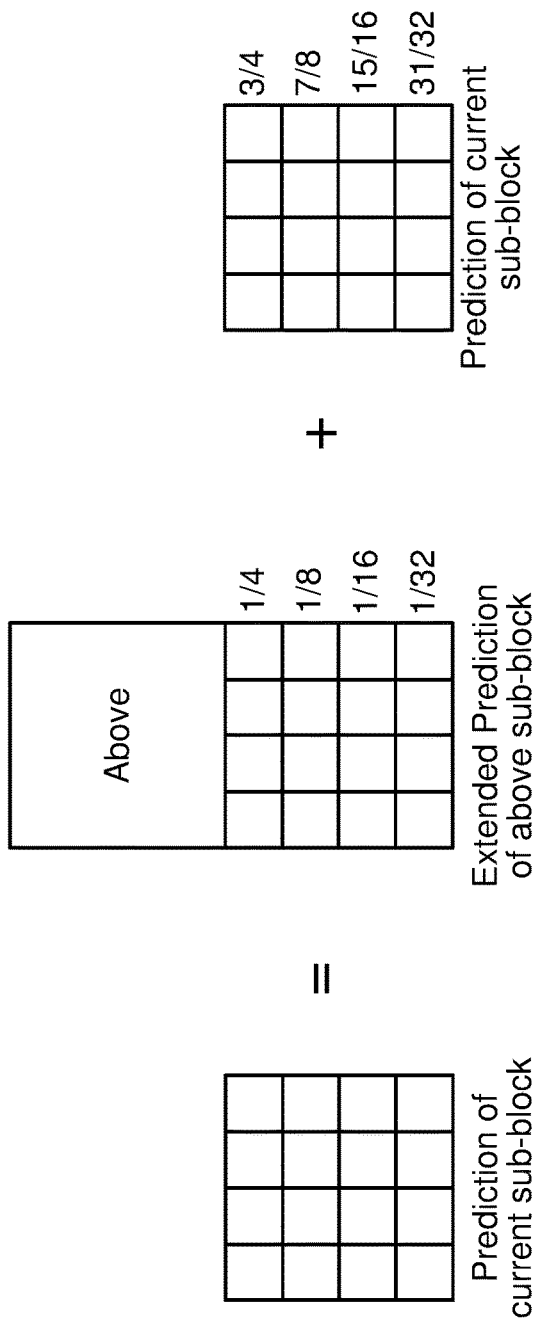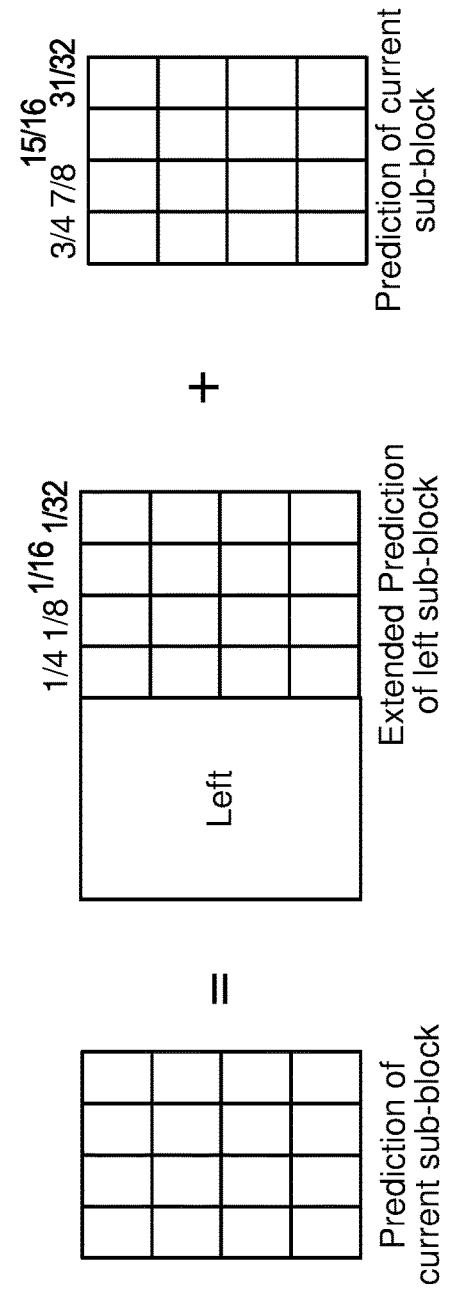
FIG. 10 (a)
FIG. 10 (b)

VARIOUS IMPROVEMENTS TO FRUC TEMPLATE MATCHING

This Application claims the benefit of U.S. Provisional Patent Application 62/573,115 filed Oct. 16, 2017, the entire content of which is incorporated by reference herein.

TECHNICAL FIELD

This application is related to the FRUC template matching in the field of video encoding and decoding.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD. Hereinafter, is available from http://phenix.int-evry.fr/jct/doc_end_user/documents/14 Vienna/wg11/JCTVC-N1003-v1.zip ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 5 (JEM 5) could be downloaded from:

https://jvet.hhi.fraunhofer.de/svn/svn_HMJEMSoftware/tags/HM-16.6-JEM-5.0/

Algorithm description of Joint Exploration Test Model 5 (JEM5) could be referred to http://phenix.it-sudparis.eu/jvet/doc_end_user/current_document.php?id=2714.

SUMMARY

This disclosure relates to a device for video decoding. The device for video decoding may include a memory configured to store video data. The device may also include a processor configured receive a bitstream including encoded video data. The processor may be configured to select a number of template matching (TM) candidates for a temporal layer or slice during the video decoding. The number of TM candidates selected are fixed prior to the video decoding, or adaptively calculated during the video decoding. The processor may be configured to generate a prediction block and residual block, based on a template matching candidate, to reconstruct the video data.

The techniques are also directed to a method of video coding, comprising selecting a number of template matching (TM) candidates based on a temporal layer or slice. The number of TM candidates selected for the temporal layer or slice may be selectively fixed prior to coding, or adaptively calculated during coding. The techniques further include determining a number of allowed TM candidates for the temporal layer or slice in the slice header, sequence parameter set (SPS), picture parameter set (PPS). The techniques may include that the determining comprises receiving a bitstream including encoded video data, and generating a prediction block and residual block, based on a template matching candidate, to reconstruct the video data when the video coding is video decoding. Moreover, the techniques may include that the selected number of template matching candidates is signaled in a bitstream of a video encoder when the video coding is video encoding.

This disclosure also relates to a device for video encoding, the device may include a memory configured to store video data. The device may also include a processor configured to select a number of template matching (TM) candidates based on a temporal layer or slice. The number of TM candidates selected for a the temporal layer or slice is selectively fixed prior to the video encoding, or adaptively calculated during the video encoding. The processor may be configured to signal a number of allowed TM candidates for a temporal layer or slice in the slice header, sequence parameter set (SPS), or picture parameter set (PPS).

This disclosure also relates to a computer readable medium having stored thereon instructions that when executed by a processor perform selecting a number of template matching (TM) candidates based on a temporal layer or slice. The number of TM candidates selected for the temporal layer or slice is selectively fixed prior to encoding or decoding, or adaptively calculated during encoding or decoding. The instructions when executed by the processor may also perform signaling a number of allowed TM candidates for the temporal layer or slice in the slice header, sequence parameter set (SPS), or picture parameter set (PPS).

This disclosure also relates to an apparatus that includes means for performing selecting a number of template matching (TM) candidates based on a temporal layer or slice. The number of TM candidates selected for the temporal layer or slice is selectively fixed prior to encoding or decoding, or adaptively calculated during encoding or decoding. The apparatus may also include means for performing signaling a number of allowed TM candidates for the temporal layer or slice in the slice header, sequence parameter set (SPS), or picture parameter set (PPS).

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIG. 1 (b) illustrates a conceptual diagram of AMVP mode.

FIG. 2 (b) illustrates a conceptual diagram of MV scaling.

FIG. 5 (b) illustrates a flowchart of a proposed FRUC template matching mode.

FIG. 7 (b) illustrates an example of BIO for an 8×4 current block with respect to a motion compensated predictor A and a 5×5 window. FIG. 7 (c) illustrates an example of BIO for an 8×4 current block with respect to a motion compensated predictor B and a 5×5 window.

FIG. 9 (b) illustrates examples of sub-blocks where OBMC applies with inter ICU sub-block mode.

FIG. 10 (b) illustrates examples of OBMC weightings using extended prediction of left sub-block. FIG. 10 (c) illustrates examples of OBMC weightings using extended prediction of below sub-block. FIG. 10 (d) illustrates examples of OBMC weightings using extended prediction of right sub-block.

DETAILED DESCRIPTION

Figure 1:
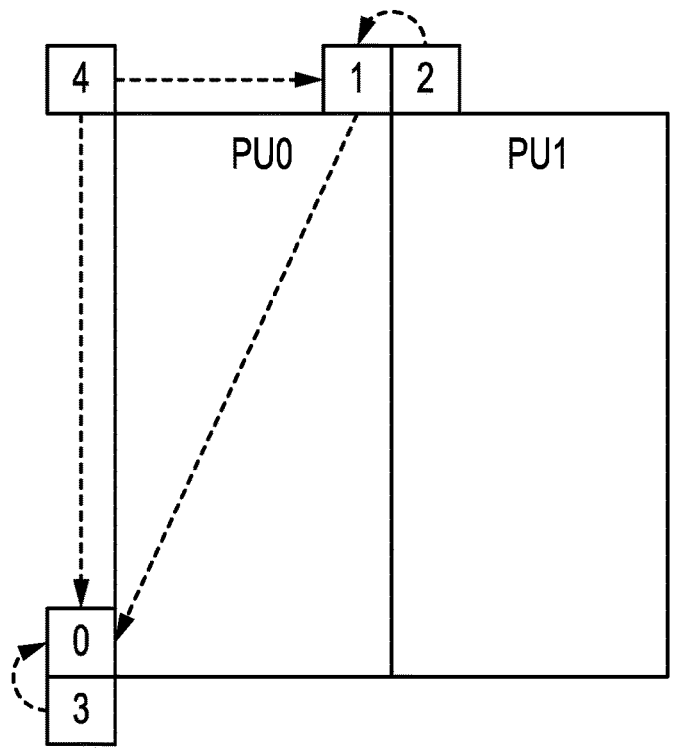
FIG. 1 (a) illustrates a conceptual diagram of Spatial neighboring MV candidates for merge mode.
Figure 1:
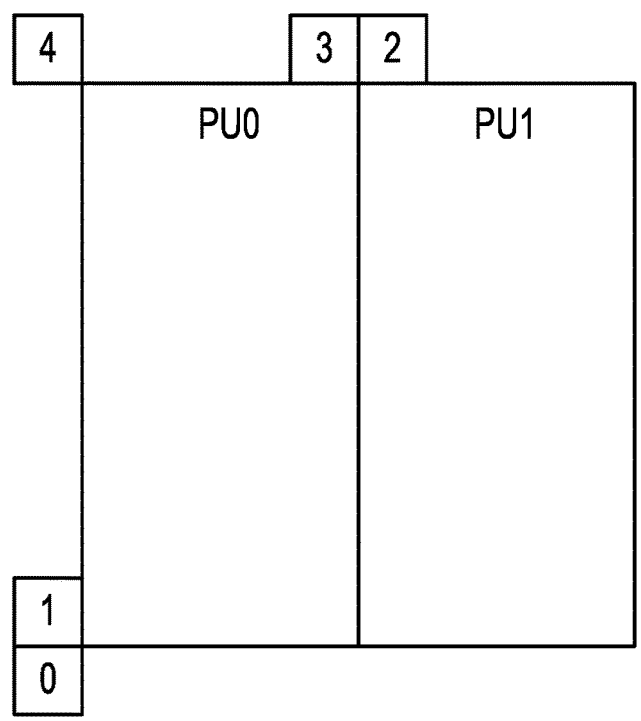

In addition to other problems addressed in the present application, one problem is related to Frame Rate Up-Conversion (FRUC) template matching. FRUC template matching provides significant bit-rate reduction as the motion vector can be derived at the decoder side. However, the coding complexity of the FRUC template matching method is high, especially at the encoder due to motion vector refinement and (Rate-Distortion) RD calculations.

Various techniques are provided herein to modify and/or simplify the current FRUC template matching techniques. One possible solution to reduce the complexity for FRUC template matching, is to select the number of template matching (TM) candidates for a given temporal layer or slice. The number of TM selected for a given temporal layer or slice can be fixed prior to encoding or decoding, or it can be adaptively calculated during the encoding or decoding process. For example, during encoding of a temporal layer or slice, or during decoding of a temporal layer or slice, the number of allowed TM candidates for a given temporal layer or slice may be included in a slice header, sequence parameter set (SPS), or picture parameter set (PPS). The inclusion of the number of TM candidates may be signaled. In an embodiment, the signaling may be explicit, i.e., the number of allowed TM candidates may be part of the slice header, SPS, or PPS that a video encoder sends in a bitstream. In a different embodiment, the signaling may be implicit, and the decoder may derive the number of allowed TM candidates, e.g., using DMVD (decoder-side motion vector derivation). Additional context will be described with reference to the figures.

CU Structure and Motion Vector Prediction in HEVC

In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information.

Motion Vector Prediction

In HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index.

The candidates for both modes are derived similarly from the same spatial and temporal neighboring blocks.

Spatial Neighboring Candidates

Spatial MV candidates are derived from the neighboring blocks shown on FIG. 1, for a specific PU ($PU_0$), although the methods generating the candidates from the blocks differ for merge and AMVP modes.

FIG. 1 (a) illustrates a conceptual diagram of Spatial neighboring MV candidates for merge mode. In merge mode, up to four spatial MV candidates can be derived with the orders showed on FIG. 1(a) with numbers, and the order is the following: left (0, A1), above (1, B1), above right (2, B0), below left (3, A0), and above left (4, B2), as shown in FIG. 1 (a).

FIG. 1(b) illustrates a conceptual diagram of AMVP mode. In AVMP mode, the neighboring blocks are divided into two groups: left group consisting of the block 0 and 1, and above group consisting of the blocks 2, 3, and 4 as shown on FIG. 1 (b). For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

Temporal Motion Vector Prediction in HEVC

Temporal motion vector predictor (TMVP) candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

Figure 2:
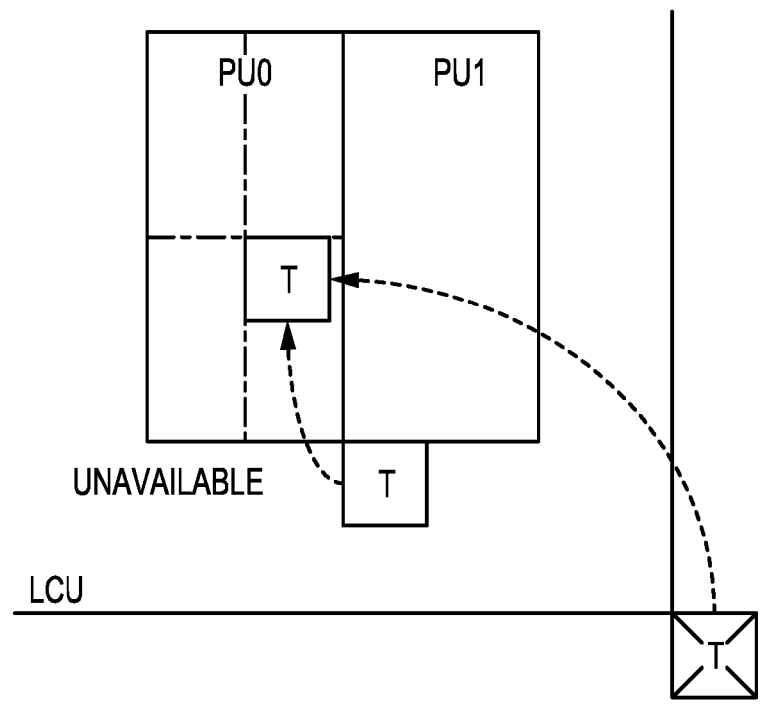
FIG. 2 (a) illustrates a conceptual diagram of TMVP candidates.
Figure 2:
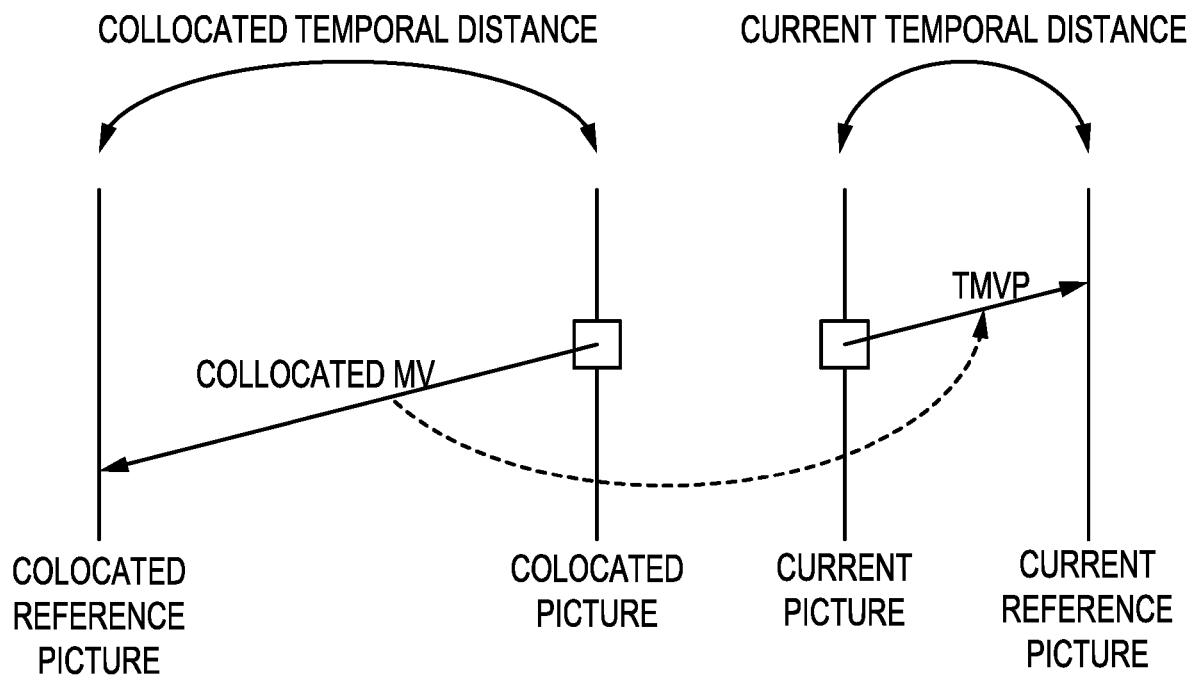

FIG. 2 (a) illustrates a conceptual diagram of TMVP candidates. FIG. 2 (b) illustrates a conceptual diagram of MV scaling. The primary block location for TMVP candidate derivation is the bottom right block outside of the collocated PU as shown in FIG. 2 (a) as a block "T," to compensate the bias to the above and left blocks used to generate spatial neighboring candidates. However, if that block is located outside of the current CTB row or motion information is not available, the block is substituted with a center block of the PU.

Motion vector for TMVP candidate is derived from the co-located PU of the co-located picture, indicated in the slice level. The motion vector for the co-located PU is called collocated MV.

Similar to temporal direct mode in AVC, to derive the TMVP candidate motion vector, the co-located MV need to be scaled to compensate the temporal distance differences, as shown in FIG. 2 (b).

Other Aspects of Motion Prediction in HEVC

Several aspects of merge and AMVP modes are worth mentioning as follows.

Motion vector scaling: it is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: if a motion vector candidate list is not complete, artificial motion vector candidates are generated and inserted at the end of the list until it will have all candidates.

In merge mode, there are two types of artificial MV candidates: combined candidate derived only for B-slices and zero candidates used only for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

Decoder-Side Motion Vector Derivation (DMVD) in JEM

In JEM reference software, there are several inter coding tools which derive or refine the motion vector (MV) for current block at the decoder side. All these decider-side MV derivation (DMVD) approaches are elaborated as below.

Pattern Matched Motion Vector Derivation

Pattern matched motion vector derivation (PMMVD) mode is a special merge mode based on Frame-Rate Up Conversion (FRUC) techniques. With this mode, motion information of a block is not signaled but derived at decoder side. This technology was included in JEM.

A FRUC flag is signalled for a CU when its merge flag is true. When the FRUC flag is false, a merge index is signalled, and the regular merge mode is used. When the FRUC flag is true, an additional FRUC mode flag is signalled to indicate which method (bilateral matching or template matching) is to be used to derive motion information for the block. The syntax table to code flags for FRUC is as follows,

| | |
|---|---|
| fruc_flag | u(1) |
| if(fruc_flag){ | |
|   if (slice_type != P_slice){ | |
|     fruc_mode | u(1) |
|   } | |
| } | |

During the motion derivation process, an initial motion vector is first derived for the whole CU based on bilateral matching or template matching. First, the merge list of the CU, or called PMMVD seeds, is checked and the candidate which leads to the minimum matching cost is selected as the starting point. Then a local search based on bilateral matching or template matching around the starting point is performed and the MV results in the minimum matching cost is taken as the MV for the whole CU. Subsequently, the motion information is further refined at sub-block level with the derived CU motion vectors as the starting points.

Figure 3:
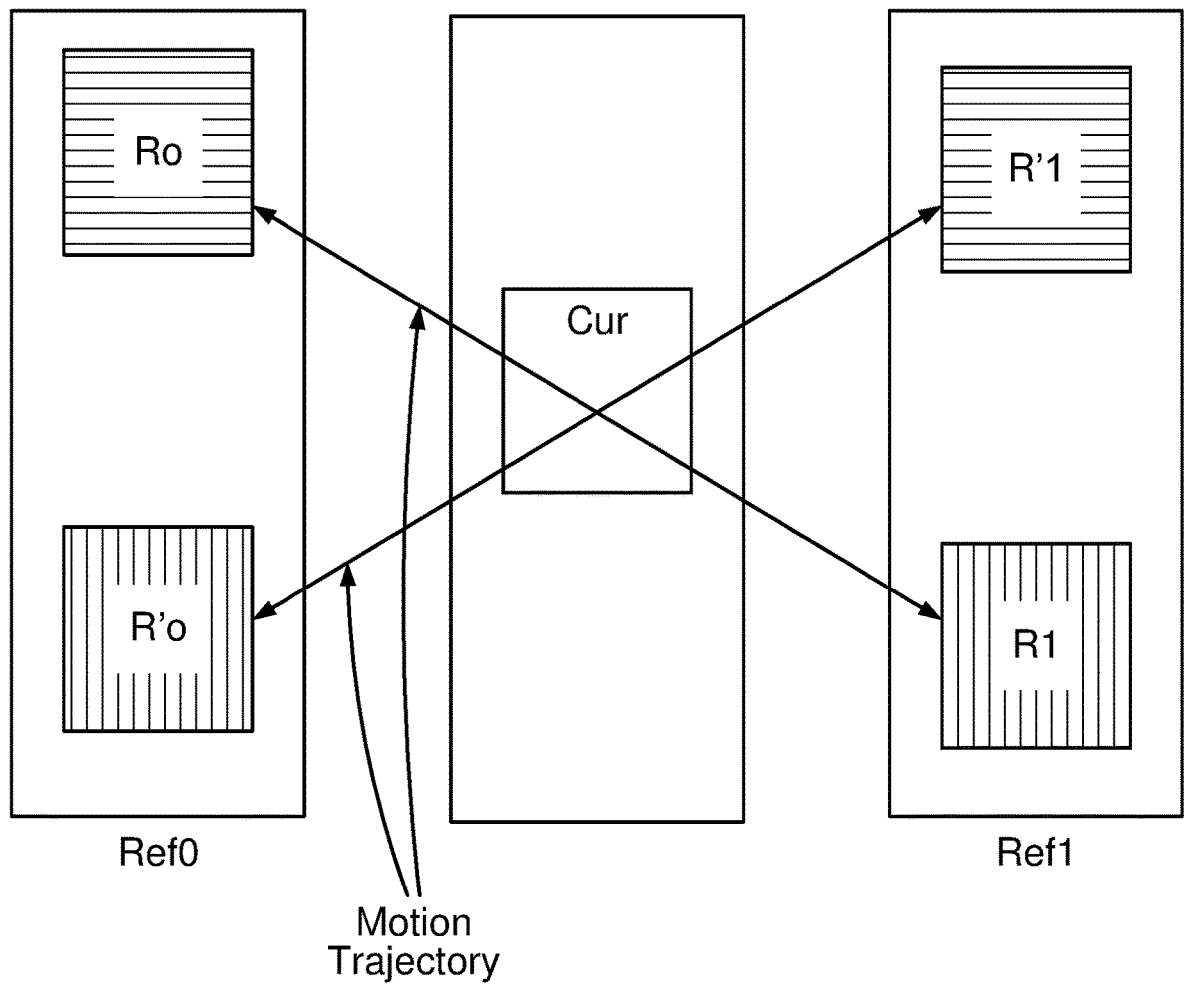
FIG. 3 illustrates a conceptual diagram of Bilateral matching.

FIG. 3 illustrates bilateral matching. As shown in the FIG. 3, the bilateral matching is used to derive motion information of the current block by finding the best match between two reference blocks along the motion trajectory of the current block in two different reference pictures. Under the assumption of continuous motion trajectory, the motion vectors MV0 and MV1 pointing to the two reference blocks shall be proportional to the temporal distances between the current picture and the two reference pictures. As a special case, when the current picture is temporally between the two reference pictures and the temporal distance from the current picture to the two reference pictures is the same, the bilateral matching becomes mirror based bi-directional MV.

Figure 4:
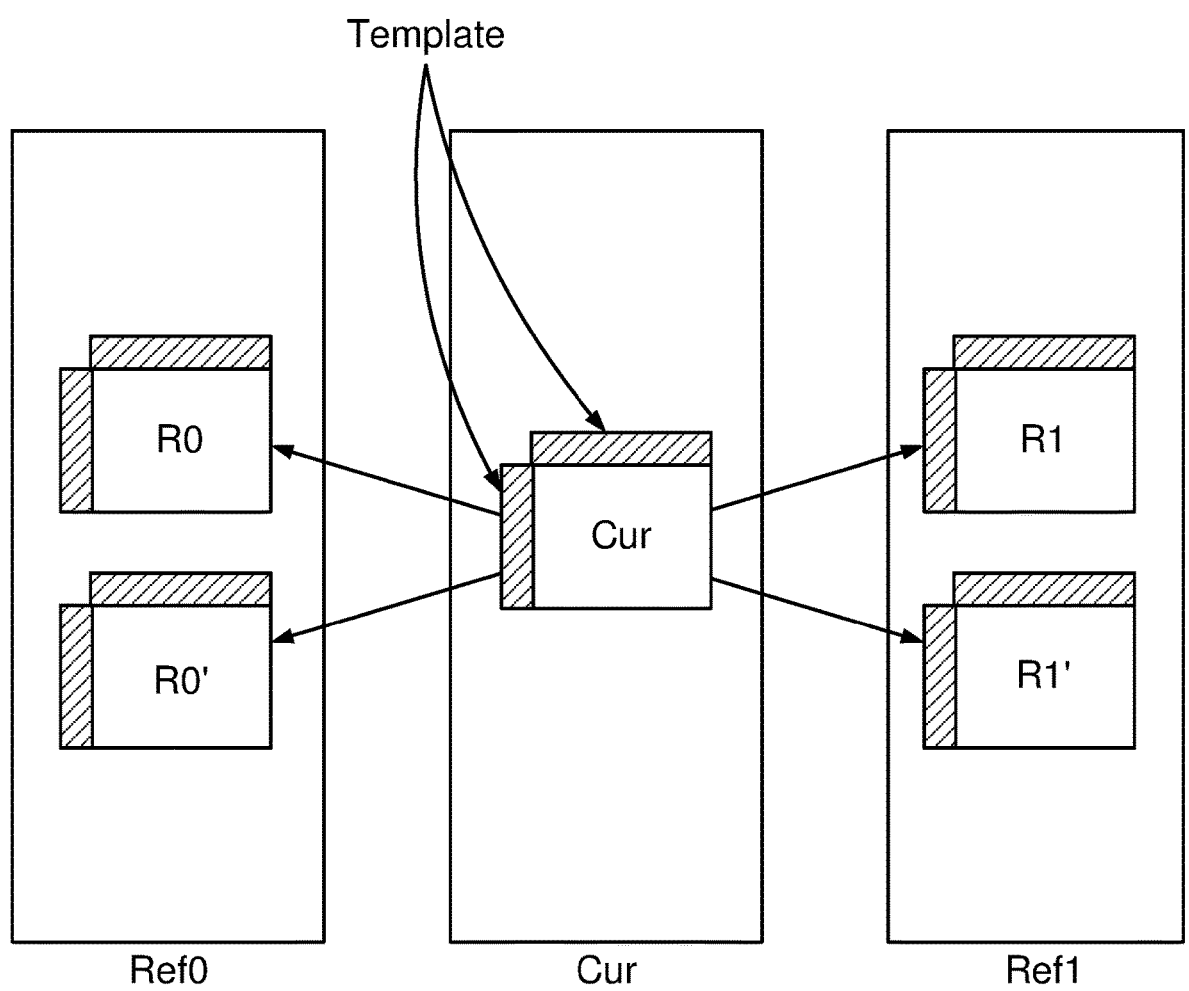
FIG. 4 illustrates a conceptual diagram of Template matching.

FIG. 4 illustrates template matching. As shown in FIG. 4, template matching is used to derive motion information of the current block by finding the best match between a template (top and/or left neighbouring blocks of the current block) in the current picture and a block (same size to the template) in a reference picture.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Figure 5:
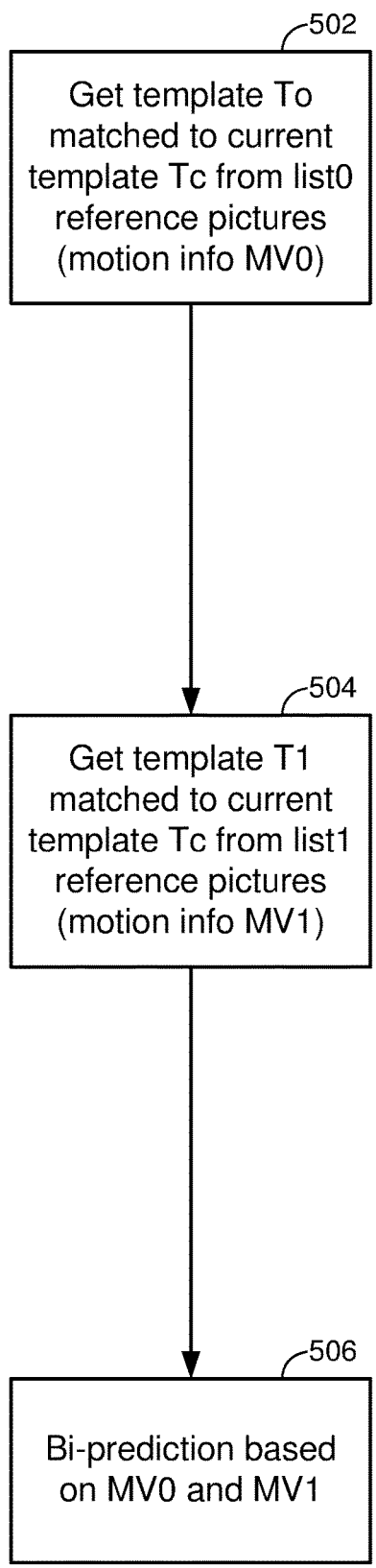
FIG. 5 (a) illustrates a flowchart of an existing FRUC template matching mode.
Figure 5:
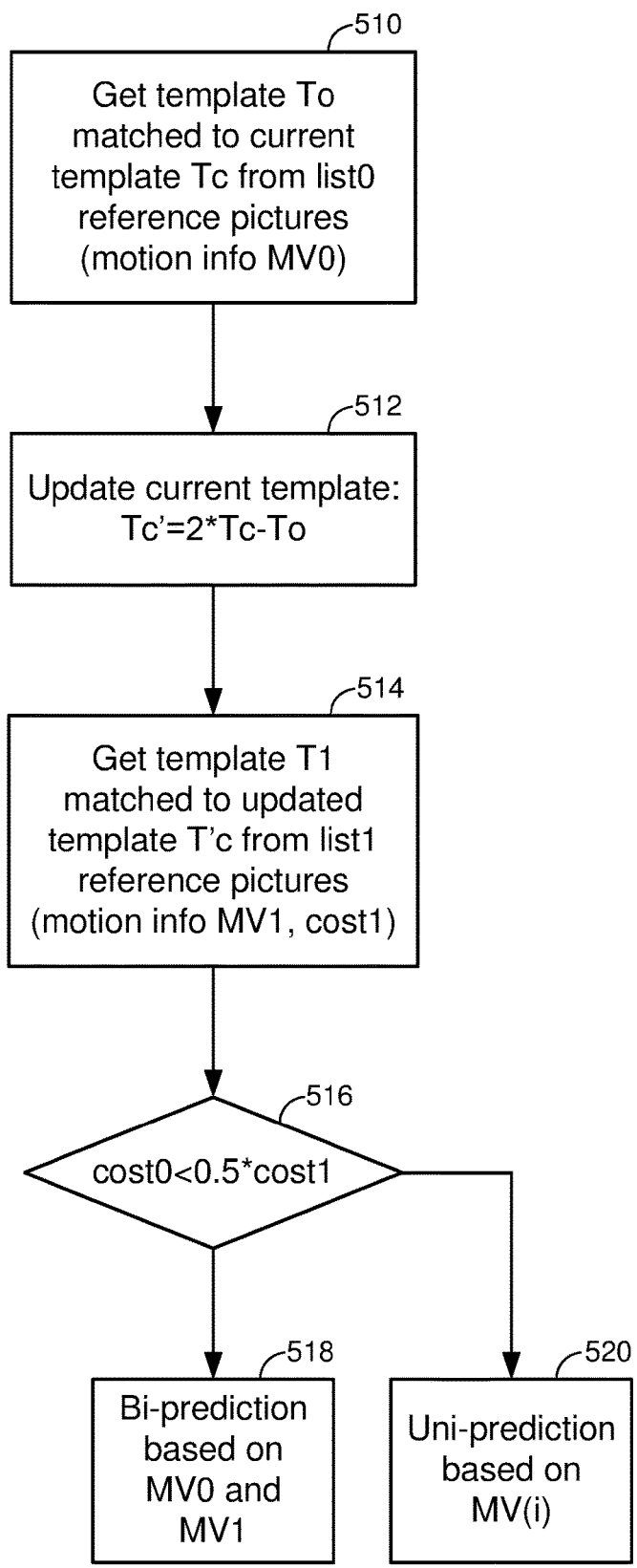

In $5^{th}$ JVET meeting, the proposal JVET-E0035 was proposed to further improve FRUC Template matching. Flowchart of the existing FRUC template matching mode is shown in FIG. 5 (a). In the first step, a template $T_0$ (and its corresponding motion information MV0) is found to match current template Tc of current block from list0 reference pictures. In the second step, template $T_1$ (and its corresponding motion information MV1) is found from list1 reference pictures. The obtained motion information MV0 and MV1 are used to perform bi-prediction to generate predictor of the current block.

The existing FRUC template matching mode is enhanced by introducing bi-directional template matching and adaptive selection between uni-prediction and bi-prediction. The proposed modifications for FRUC template matching mode are in FIG. 5 (b), compared to FIG. 5 (a) which illustrates the existing FRUC template matching mode. A proposed bi-directional template matching is implemented based on the existing uni-directional template matching. As shown in FIG. 5 (b), a matched template $T_0$ is firstly found in the first step of template matching from list0 reference pictures (Noted that list0 here is only taken as an example. In fact, whether list0 or list1 used in the first step is adaptive to initial distortion cost between current template and initial template in corresponding reference picture. The initial template can be determined with initial motion information of the current block which is available before performing the $1^{st}$ template matching. The reference picture list corresponding to minimal initial template distortion cost will be used in the first step of template matching. For example, if initial template distortion cost corresponding to list0 is no larger than cost corresponding to list1, list0 is used in the first step of template matching and list1 is used in the second step), then, the current template $T_C$ of current block is updated as follows: $T'_C = 2*T_C - T_0$.

The updated current template $T'_C$ instead of the current template $T_C$ is utilized to find another matched template $T_1$ from list1 reference pictures in the second template matching. As a result, the matched template $T_1$ is founded by jointly using list0 and list1 reference pictures. This matching process is called bi-directional template matching.

The proposed selection between uni-prediction and bi-prediction for motion compensation prediction (MCP) is based on template matching distortion. As shown in FIG. 5 (b), during template matching, distortion between template $T_0$ and $T_C$ (the current template) can be calculated as cost0, and distortion between template $T_1$ and $T'_C$ (the updated current template) can be calculated as cost1. If cost0 is less than 0.5*cost1, uni-prediction based on MV0 is applied to FRUC template matching mode; otherwise, bi-prediction based on MV0 and MV1 is applied. Noted that cost0 is compared to 0.5*cost1 since cost1 indicates difference between template $T_1$ and $T'_C$ (the updated current template), which is 2 times of difference between Tc (the current template) and its prediction of $0.5*(T_0+T_1)$. It is noted that the proposed methods are only applied to PU-level motion refinement. Sub-PU level motion refinement keeps unchanged.

Bi-Directional Optical Flow in JEM

Figure 6:
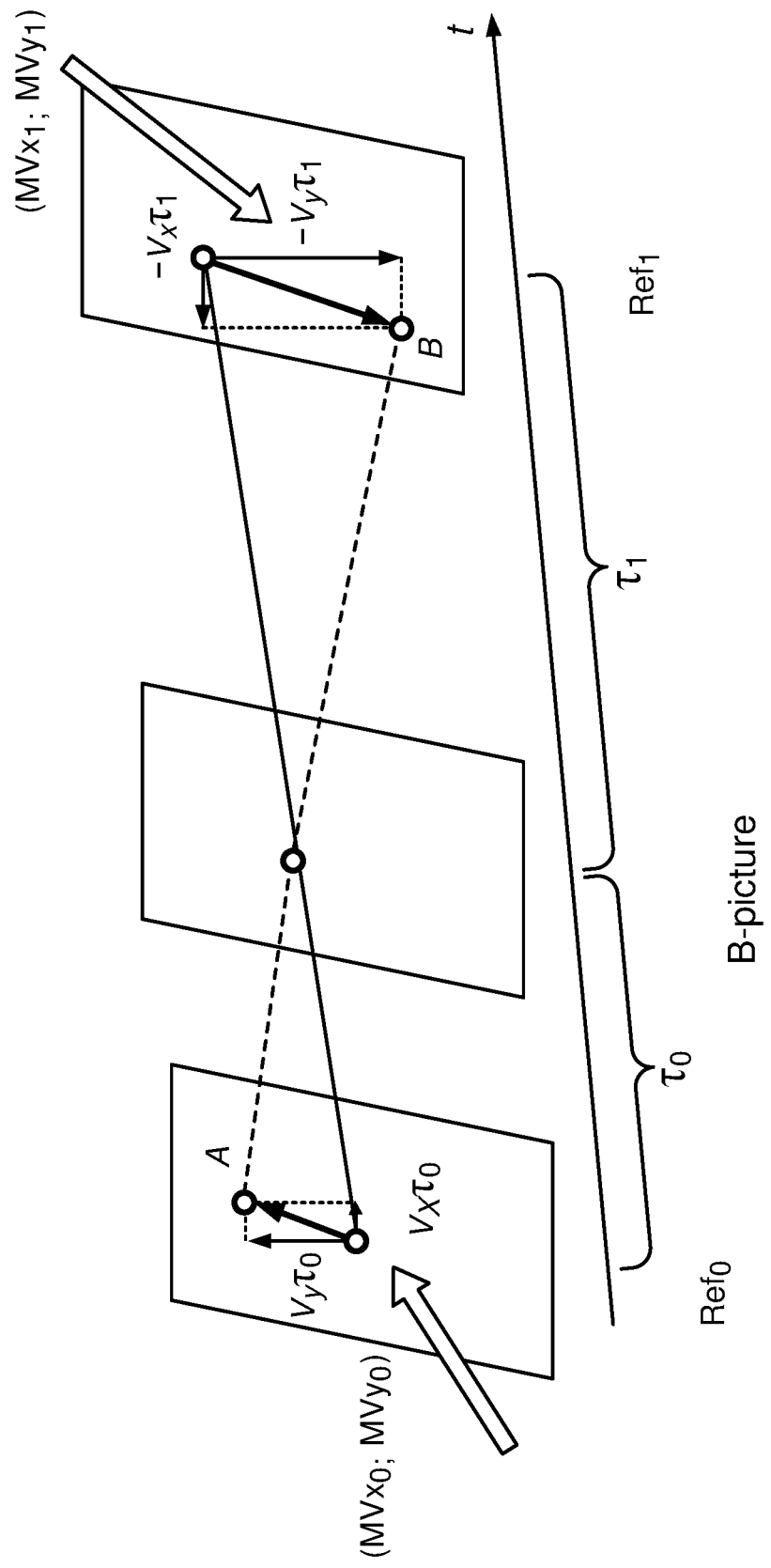
FIG. 6: illustrates a conceptual diagram of optical flow trajectory.

FIG. 6 illustrates optical flow trajectory. Bi-directional Optical flow (BIO) is pixel-wise motion refinement which is performed on top of block-wise motion compensation in a case of bi-prediction. Since it compensates the fine motion can inside the block enabling BIO results in enlarging block size for motion compensation. Sample-level motion refinement doesn't require exhaustive search or signaling since there is explicit equation which gives fine motion vector for each sample.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \quad (1)$$

Combining optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO} = \tfrac{1}{2} \cdot (I^{(0)} + I^{(1)}) + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Here $\tau_0$ and $\tau_1$ denote the distance to reference frames as shown on a FIG. 6. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\sigma_0 \cdot \sigma_1 < 0$. In this case BIO is applied only if prediction come not from the same time moment ($\tau_0 \neq \tau_1$), both referenced regions have non-zero motion ($MVx_0$, $MVy_0$, $MVx_1$, $MVy_1 \neq 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference Δ between values in points A and B (intersection of motion trajectory and reference frame planes on FIG. 6). Model uses only first linear term of local Taylor expansion for Δ:

$$\Delta = (I^{(0)} - I^{(1)})_0 + v_x(\tau_1 \partial I^{(1)}/\partial x - \tau_0 \partial I^{(0)}/\partial x) + v_y(\tau_1 \partial I^{(1)}/\partial y - \tau_0 \partial I^{(0)}/\partial y)) \quad (3)$$

All values in (1) depend on sample location (i', j'), which was omitted so far. Assuming the motion is consistent in local surrounding we minimize Δ inside (2M+1)×(2M+1) square window Ω centered in currently predicted point (i, j):

$$(v_x, v_y) = \underset{v_x, v_y}{\text{argmin}} \sum_{[i',j] \in \Omega} \Delta^2[i', j'] \quad (4)$$

For this optimization problem we use simplified solution making first minimization in vertical and then in horizontal directions. It results in $$v_x = (s_1 + r) > m ? \; clip3\left(-thBIO, thBIO, -\frac{s_3}{(s_1+r)}\right):0 \quad (5)$$

-continued $$v_y = (s_5 + r) > m ? \; clip3\left(-thBIO, thBIO, -\frac{s_6 - v_x s_2/2}{(s_5 + r)}\right):0 \quad (6)$$

where, $$s_1 = \sum_{[i',j]\in\Omega} (\tau_1 \partial I^{(1)}/\partial x + \tau_0 \partial I^{(0)}/\partial x)^2; \quad (7)$$

$$s_3 = \sum_{[i',j]\in\Omega} (I^{(1)} - I^{(0)})(\tau_1 \partial I^{(1)}/\partial x + \tau_0 \partial I^{(0)}/\partial x);$$

$$s_2 = \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j]\in\Omega} (\tau_1 \partial I^{(1)}/\partial y + \tau_0 \partial I^{(0)}/\partial y)^2;$$

$$s_6 = \sum_{[i',j]\in\Omega} (I^{(1)} - I^{(0)})(\tau_1 \partial I^{(1)}/\partial y + \tau_0 \partial I^{(0)}/\partial y)$$

In order to avoid division by zero or very small value, regularization parameters r and m are introduced in equations (2), (3).

$$r = 500 \cdot 4^{d-8} \quad (8)$$

$$m = 700 \cdot 4^{d-8} \quad (9)$$

Here d is internal bit-depth of the input video.

In some cases, MV regiment of BIO might be unreliable due to noise or irregular motion. Therefore, in BIO, the magnitude of MV regiment is clipped to the certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$ otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 7:
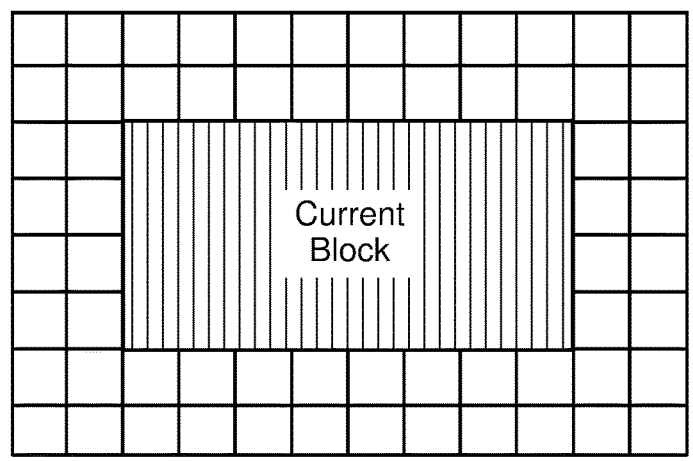
FIG. 7 (a) illustrates an example of an 8×4 current block.
Figure 7:
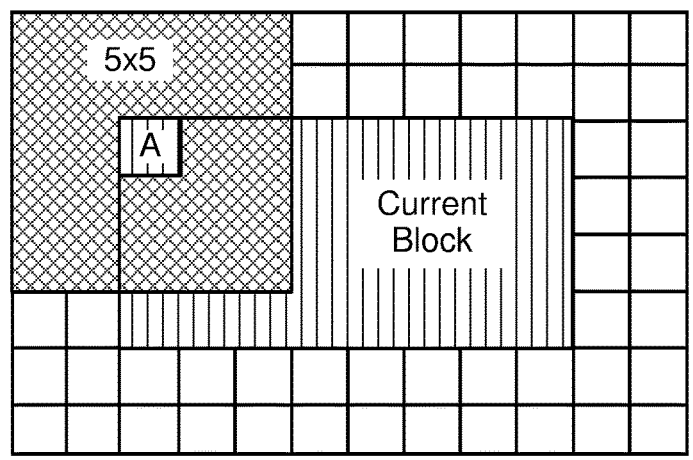
Figure 7:
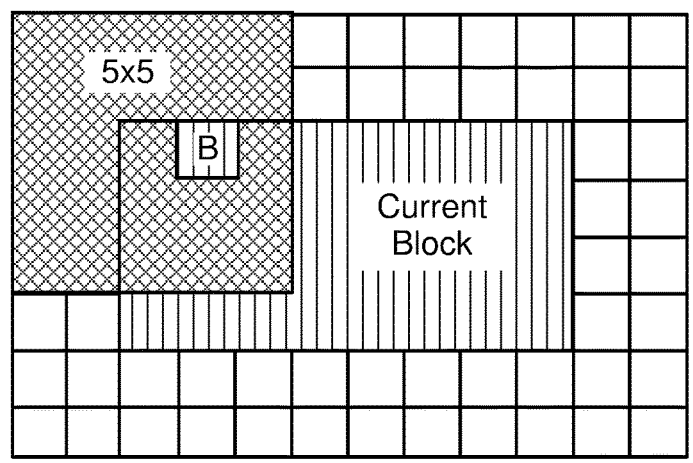

FIG. 7 (a) illustrates an example of an 8×4 current block. FIG. 7 (b) illustrates an example of BIO for an 8×4 current block with respect to a motion compensated predictor A and a 5×5 window. FIG. 7 (c) illustrates an example of BIO for an 8×4 current block with respect to a motion compensated predictor B and a 5×5 window. For an 8×4 blocks, it needs to fetch the motion compensated predictors and calculate the HOR/VERgradients of all the pixels within current block as well as the outer two lines of pixels because solving vx and vy for each pixel needs the HOR/VER gradient values and motion compensated predictors of the pixels within the window Ω centered in each pixel as shown in equation (4). In JEM, the size of this window is set to 5×5, it therefore needs to fetch the motion compensated predictors and calculate the gradients for the outer two lines of pixels.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, BIO is applied to all bi-directional predicted blocks when the two predictions are from different reference pictures. When LIC is enabled for a CU, BIO is disabled.

Bilateral Template Matching

Figure 8:
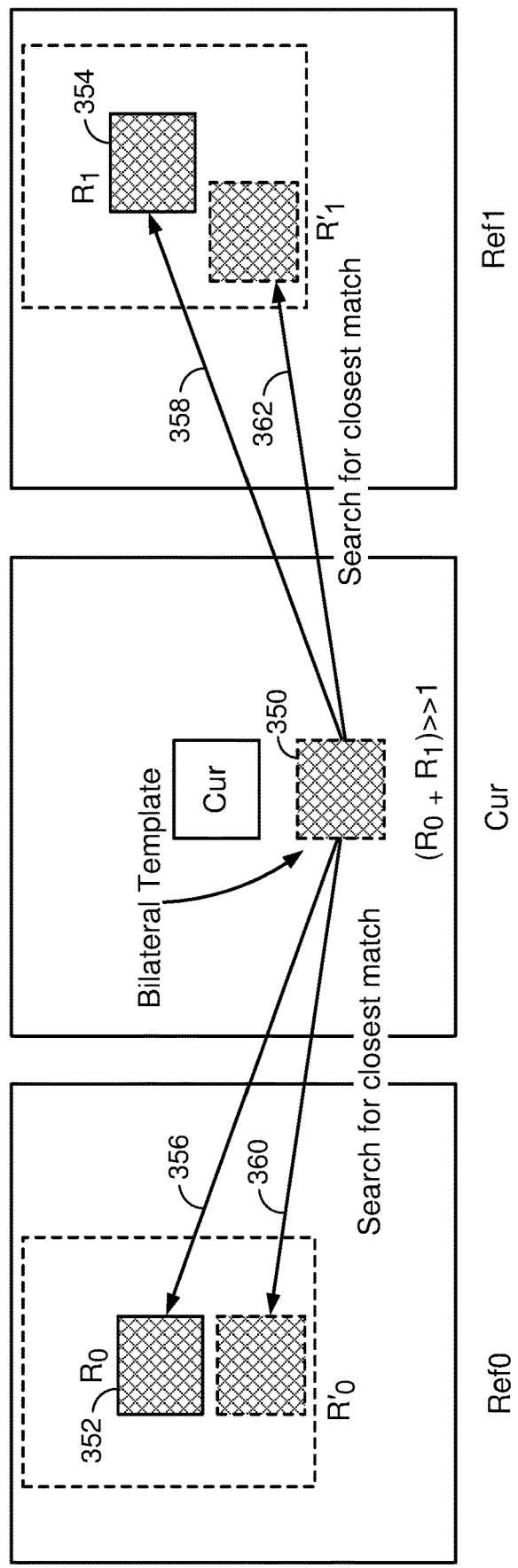
FIG. 8 illustrates a proposed DMVD based on bilateral template matching.

FIG. 8 illustrates FIG. 8 Proposed DMVD based on bilateral template matching. A bilateral template is generated as the weighted combination of the two prediction blocks, from the initial MV0 of list0 and MV1 of list1 respectively, as shown in FIG. 8. The template matching operation consists of calculating cost measures between the generated template and the sample region (around the initial prediction block) in the reference picture. For each of the two reference pictures, the MV that yields the minimum template cost is considered as the updated MV of that list to replace the original one. Finally, the two new MVs, i.e., MV0' and MV1' as shown in FIG. 8, are used for regular bi-prediction. As it is commonly used in block-matching motion estimation, the sum of absolute differences (SAD) is utilized as cost measure.

The proposed decoder-side motion vector derivation (DMVD) is applied for merge mode of bi-prediction with one from the reference picture in the past and the other from reference picture in the future, without the transmission of additional syntax element. In the context of this disclosure, the bilateral template matching may also be described as a hierarchical temporal matching process. The base temporal layer may be viewed as compression of a sequence of consecutive frames without considering a higher level operation that takes into account a relationship between the sequence of consecutive frames, e.g., a base temporal layer may include an independent frame (I-frame) and prediction frames (P-frames), where the prediction frames were predicted based on an I-frame. However, a bi-lateral matching technique may create the use of a B-frame, which allows for predicting a frame based on taking into account differences between a current frame and both the previous frame and following frame to specify its content (e.g., as seen in FIG. 8). Thus, in the example a B-frame represents a higher temporal layer. The base temporal layer is a lower temporal layer.

In JEM4.0, when LIC, affine, sub-CU merge candidate or FRUC is selected for one CU, the DMVR is not applied.

Overlapped Block Motion Compensation (OBMC) in JEM

Figure 9:
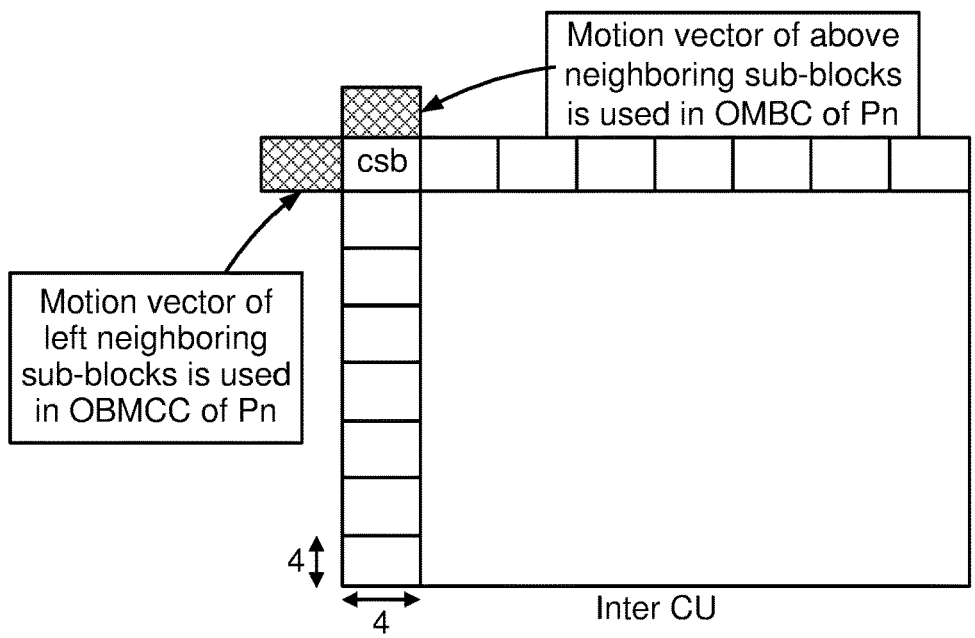
FIG. 9 (a) illustrates examples of sub-blocks where OBMC applies with inter ICU mode.
Figure 9:
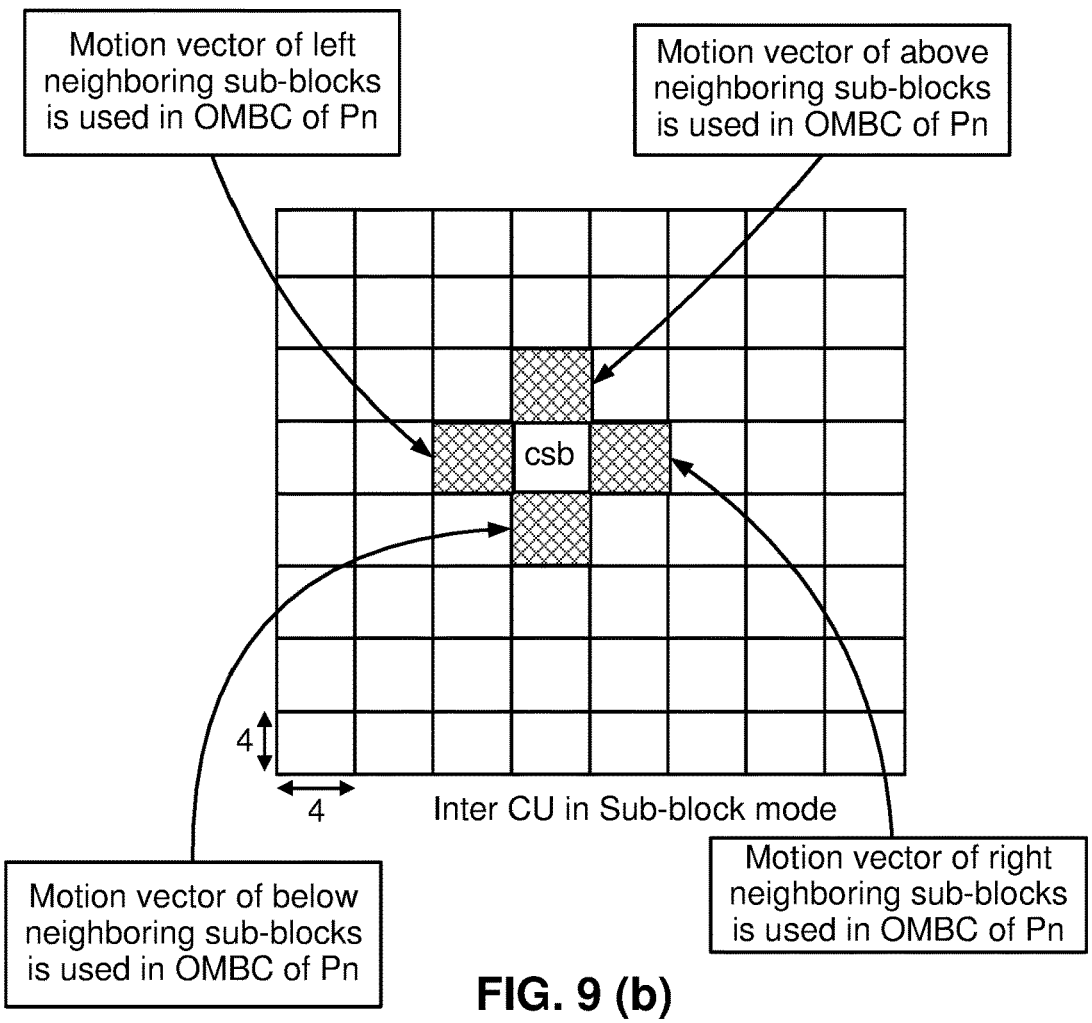

FIG. 9 (a) illustrates examples of sub-blocks where OBMC applies with inter ICU mode. FIG. 9 (b) illustrates examples of sub-blocks where OBMC applies with inter ICU sub-block mode. The Overlapped Block Motion Compensation (OBMC) has been used for early generations of video standards, e.g., as in H.263. In JEM, the OBMC is performed for all Motion Compensated (MC) block boundaries except the right and bottom boundaries of a CU. Moreover, it is applied for both luma and chroma components. In JEM, a MC block is corresponding to a coding block. When a CU is coded with sub-CU mode (includes sub-CU merge, Affine and FRUC mode [3]), each sub-block of the CU is a MC block. To process CU boundaries in a uniform fashion, OBMC is performed at sub-block level for all MC block boundaries, where sub-block size is set equal to 4×4, as illustrated in FIG. 9.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Figure 10:
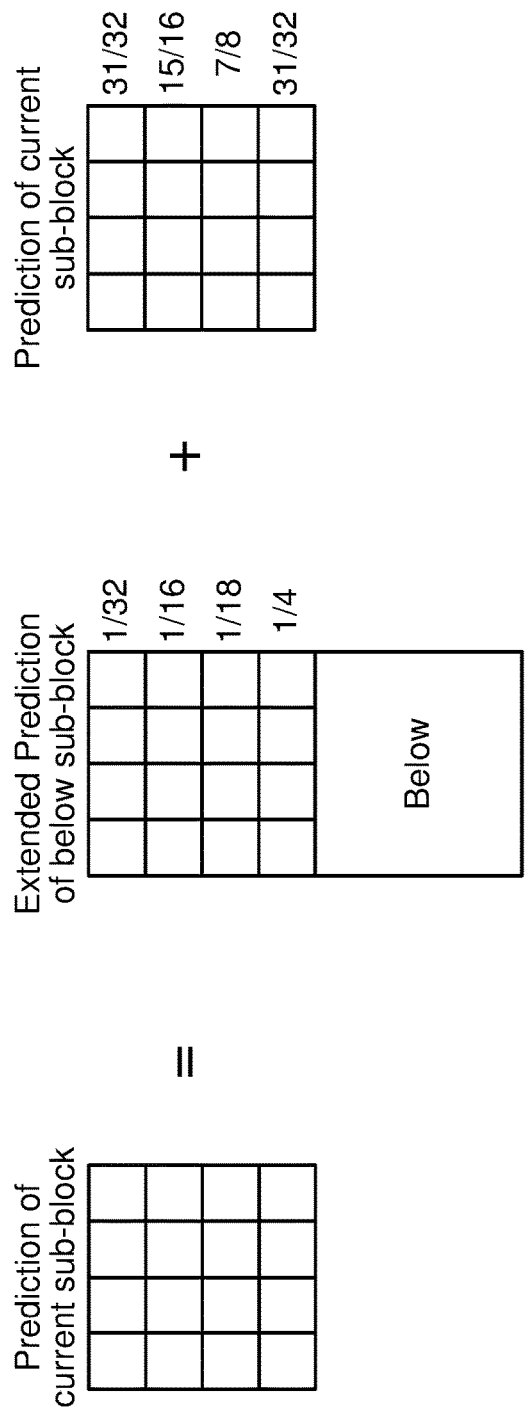
FIG. 10 (a) illustrates examples of OBMC weightings using extended prediction of above sub-block.
Figure 10:
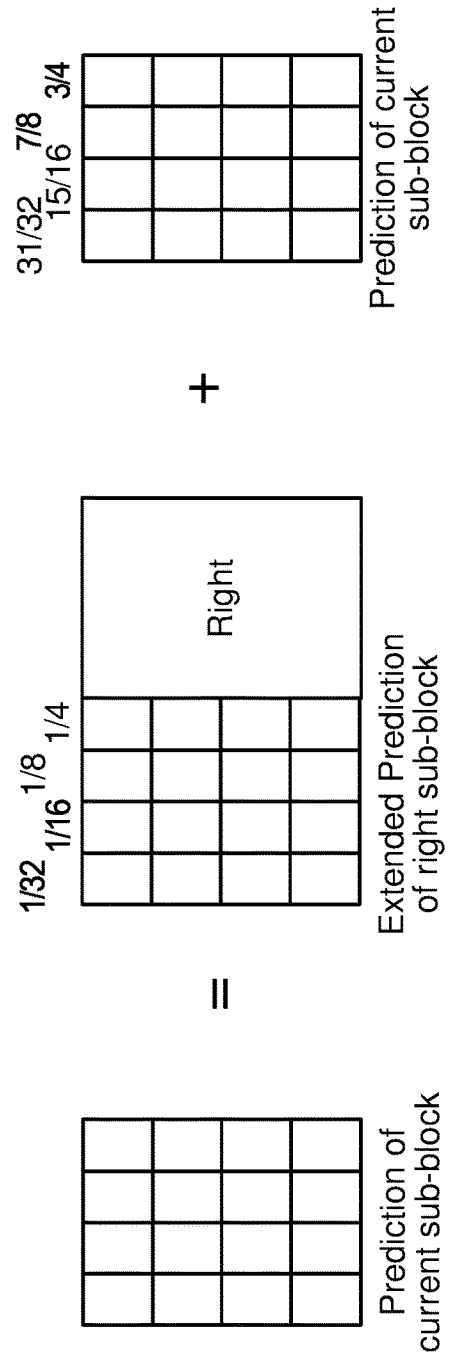
Figure 11:
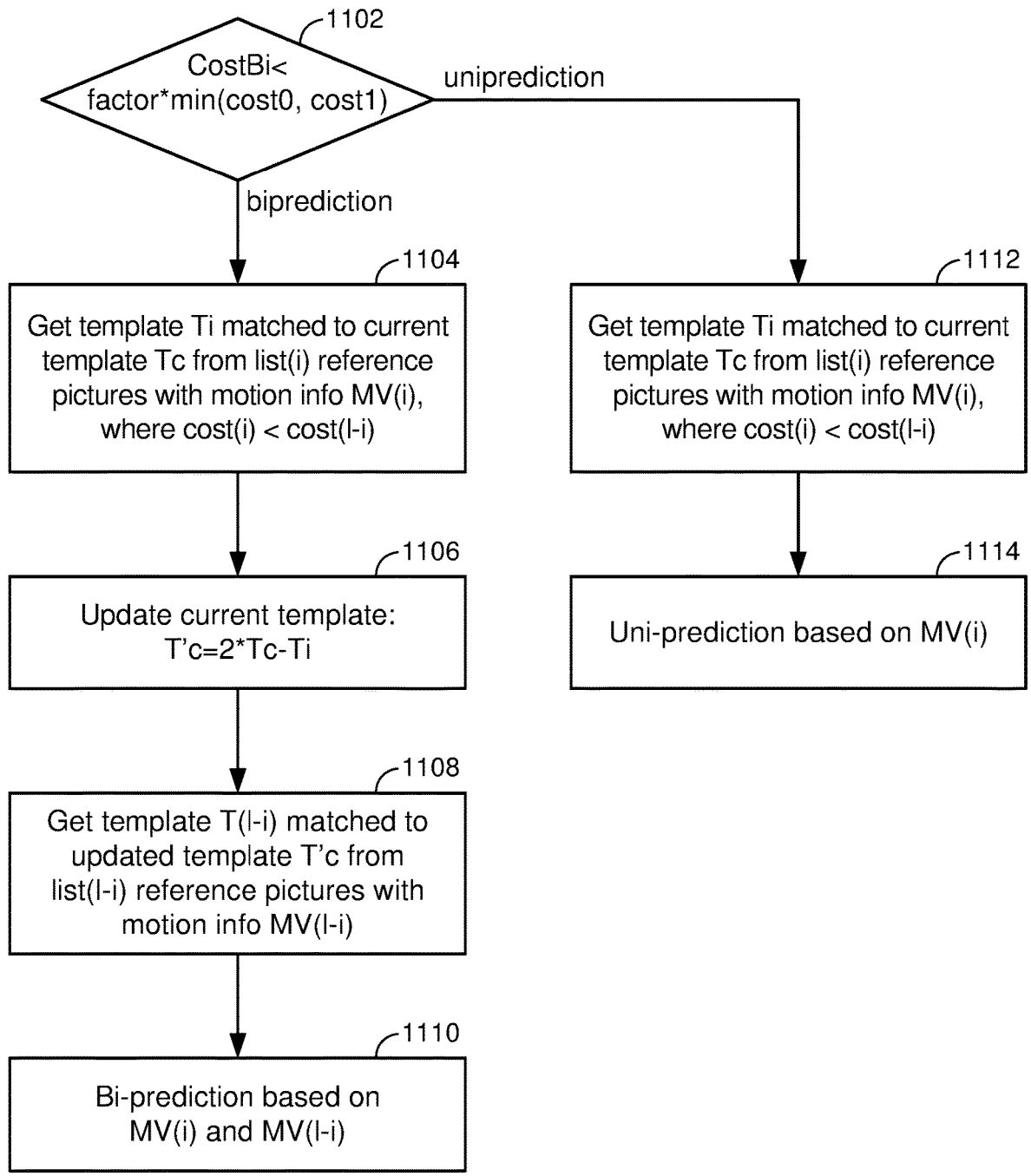
FIG. 11 Illustrates a flowchart of a process to decide between carrying out a bi-prediction template matching or uni-prediction template matching.

FIG. 10 (a) illustrates examples of OBMC weightings using extended prediction of above sub-block. FIG. 10 (b) illustrates examples of OBMC weightings using extended prediction of left sub-block. FIG. 10 (c) illustrates examples of OBMC weightings using extended prediction of below sub-block. FIG. 10 (d) illustrates examples of OBMC weightings using extended prediction of right sub-block. As shown in FIG. 10(a)-(d), a prediction block based on motion vectors of a neighbouring sub-block is denoted as $P_N$, with N indicating an index for the neighbouring above, below, left and right sub-blocks and a prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every pixel of $P_N$ is added to the same pixel in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighbouring sub-block, pixels in the same row (column) of $P_N$ are added to $P_C$ with a same weighting factor. It is noted that BIO is also applied for the derivation of the prediction block Pn.

In JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At encoder, when OBMC is applied for a CU, its impact is considered during motion estimation stage. The prediction signal by using motion information of the top neighboring block and the left neighboring block is used to compensate the top and left boundaries of the original signal of the current CU, and then the normal motion estimation process is applied.

As previously introduced above, in addition to other problems addressed in the present application, one problem is related to FRUC template matching. FRUC template matching provides significant bit-rate reduction as the motion vector can be derived at the decoder side. However, the coding complexity of the FRUC template matching method is high, especially at the encoder due to motion vector refinement and RD calculations.

Various techniques are provided herein to modify and/or simplify the current FRUC template matching method. The following itemized methods may be applied individually. Alternatively, any combination of them may be applied.

Various techniques are provided herein to modify and/or simplify the current FRUC template matching techniques. One possible solution to reduce the complexity for FRUC template matching, is to select the number of template matching (TM) candidates for a given temporal layer or slice. The number of TM selected for a given temporal layer or slice can be fixed prior to encoding or decoding, or it can be adaptively calculated during the encoding or decoding process. During the decoding process, a bitstream may be received by a video decoder. The bitstream may include encoded video data. To reconstruct the video data a prediction block and residual block may be generated based on a template matching candidate. The video decoder may receive a bitstream that also includes a syntax element representing the number of template matching candidates for the given temporal layer or slice. The reconstructed video data may be used determine the number of template matching candidates for the given temporal layer or slice.

In addition, there may be other fields in the bitstream to explicitly signal the number of template matching candidates. For example, during encoding of a temporal layer or slice, or during decoding of a temporal layer or slice, the number of allowed TM candidates for a given temporal layer or slice may be included in a slice header, sequence parameter set (SPS), or picture parameter set (PPS). The inclusion of the number of TM candidates may be signaled. In an embodiment, the signaling may be explicit, i.e., the number of allowed TM candidates may be part of the slice header, SPS, or PPS that a video encoder includes in a bitstream, output by the video encoder.

A slice may be a one frame or part of a frame (e.g., a set of rows, or even partial rows of a frame). The encoder may output a slice header to indicate how the components of the frame or part of the frame are represented in a particular slice. Included in the slice header may be the number of allowed TM candidates. If there are multiple slices in a picture, the PPS may include different parameters for each slice. One of these sets of parameters may include the number of allowed TM candidates per PPS. A sequence of pictures may include sets of parameters that are common or different as part of the encoding or decoding. One of these sets of parameters may include the number of allowed TM candidates per SPS.

For example, a syntax element may be included in the bitstream which represents the number of allowed TM candidates per a given slice or temporal layer (i.e., a base layer or higher layer). In one example, the number of TM candidates may be larger for the lower temporal layer when compared to the number of TM candidates in the higher temporal layer. This may occur because there may be less correlation between the content of frames at a lower temporal layer than a higher temporal layer.

In a different embodiment, the signaling may be implicit, and the decoder may derive the number of allowed TM candidates using DMVD. The DMVD may generate motion vectors. FRUC mode is a special merge mode, with which motion information of a block is not signaled but derived at the decoder side. Depending on the content of the video data that was compressed and sent in the bitstream from the video encoder to the video decoder, the number of allowed TM candidates may be derived.

There is a trade-off between selecting too many template matching candidates and too few template matching candidates. For example, too many template matching candidates, e.g. 50 may increase the complexity of the encoding or decoding process as too many comparisons may take place. If there are too few template matching candidates, e.g. 2, the comparisons may be less, but there may not be enough coding efficiency gained.

The solution of providing TM candidates prior to encoding or decoding, or during encoding or decoding may also depend on the rate of change of the motion vectors generated based on the content of the video data.

At either the encoder or decoder, a check may be performed to see if there is a fast rate of change of the motion vectors. In one embodiment, to measure the rate of change of motion, the mean or variance from a history motion vectors may be analyzed. As an example, if the variance of horizontal and vertical components are both greater than 10 the number of temporal matched candidates may be set to three or more. If the variance of horizontal and vertical component are both less than 10, the number of temporal candidates may be set to one less than the case where the horizontal and vertical components were both greater than 10, i.e., 2, 3 or 4. The number 10 is just an example, but depending on the distribution of the motion vectors a different variance value may be used, e.g. a number between 4-9, or 11-15, or possibly larger if the density of the pixels in a frame is larger. If the number of selected temporal matched candidates are not adaptively calculated they may be set to a pre-defined default value, e.g. 10.

Similarly, the candidate number of template matching when the illumination compensation (IC) on is signaled in a slice header, an SPS, or PPS. Illumination compensation may be used to compensate for non-uniform distributions of illuminations in a frame. When IC is on, it may be more challenging to find coding efficiencies based on motion vector motion. However, in this disclosure, the many number of TM candidates may be signaled (implicitly or explicitly) taking into account the status of the IC block, i.e., whether there is an IC flag that is on or off.

In one example, the number of TM candidates per temporal layer or slice may be applied only when IC flag is OFF for a given CU. In another example, when the IC flag is ON for a given CU, the number of TM candidates may be fixed irrespective of the temporal layer or slice.

In another example, a metric used by an IC-enabled frame rate up conversion search is based on the number of the neighboring samples in the template to perform search.

An edge-preserving denoise filter, such as bilateral filter, may be applied for the current, L0, and L1 template before a search is performed. When the number of reference samples in the template exceed a threshold T, mean-removal based metric such as Mean-Removed Sum of Absolute Difference (MR-SAD) or Normalized Cross Correlation (NCC) can be used to find the closest motion vector. A person having ordinary skill in the art may recognize the closest motion vector as the best motion vector. The reference samples in a template may be a multiple of the number of rows or columns of a coding unit. For example, the threshold may be 16 or 32 samples in either the horizontal or vertical direction, or both.

In an embodiment, it is also possible that when the number of reference samples in the template do not exceed the threshold, the regular metric of SAD or Sum of Squared Difference (SSD) may be used. The threshold may be pre-defined or signaled as part of a SPS, a PPS, or a slice header.

In another example, the maximum number of candidates for FRUC TM is signaled as part of an SPS, a PPS, or a slice header. The maximum number of candidates may refer to the combined number of candidates between IC-enabled and non-illumination compensation (non-IC) FRUC TM.

The maximum number of candidates may be based on a combination illumination compensation (IC) enabled and non-illumination compensation (IC) enabled TM candidates. For example, when the neighboring blocks of the prediction block are illumination compensated blocks, the maximum number of TM candidates is N, and N−1 TM candidates are designated as IC enabled and one TM candidate is designated as non-IC enabled. In another example, the number of either the IC enabled TM candidates or non-IC enabled TM candidates use a default value that includes at least two IC enabled TM candidates and four non-IC enabled TM candidates.

in an embodiment, if the maximum number of candidates is represented as N, when the neighboring blocks of the current block are coded as IC block's, it may be desirable to assign N−1 TM candidates during the IC-enabled case, i.e., when IC is on. The remaining singular TM candidate may be assigned to the non-IC case.

In an alternative embodiment, the number of candidates for either IC or non-IC case may have a default value, including but not limited to two candidates for the IC-enabled case, and four TM candidates for the non-IC case.

In yet another alternative embodiment, the ratio of the neighboring 4×4 blocks which are coded with IC flags of 1 may be used as a context to encode the IC flag for FRUC TM.

It may be also possible, in another scenario to have the maximum number of TM candidates may be determined prior to encoding, decoding, or may be calculated during encoding or decoding. For example, as mentioned previously having too many TM candidates may increase complexity of coding. Thus, setting a maximum number per slice, or temporal layer may be desired. Similarly, the maximum number of TM candidates may be set as part of the SPS or PPS. Over a given sequence of frames or slices, it may be desirable to signal a limited number of TM candidates. In an embodiment, the number of TM candidates may be signaled as part of the SPS, PPS or slice header. The difference between the maximum number of TM candidates and the actual number of allowed TM candidates at a given slice may be signaled in the slice header. Note that the actual number of TM candidates at a given slice must be less than or equal to the maximum number of TM candidates.

In another scenario for FRUC template matching, instead of selecting the first N candidates from the M merge list candidates (where N<M) it may be possible to further prune the merge list candidates before selecting the N candidates. The pruning may be carried out independently for lists L0 and L1. For example, the first candidate from the list L0 may be kept unchanged and added as the first candidate in the TM candidate list L0 of size N. Next, the first and second candidate in list L0 may be pruned by comparing the motion vector and the reference index. If the candidates are not identical, the second candidate in list L0 may be added to the TM candidate list L0 of size N, otherwise, the second candidate is not added.

Two candidates are said to be identical or similar may be based on the value of reference index and motion vector. For example, the following rules proposed in IDF 180270 may be used: i) reference indexes of both candidates are the same (ii) absolute difference of the horizontal motion vector is less than $mvd_{th}$ (iii) absolute difference of the vertical motion vector is less than $mvd_{th}$.

In JEM, $mvd_{th}$ is calculated as $$mvd_{th} = 4 << mv_{precision} \quad (1)$$
$$\text{if } (W \cdot H < 64) == > mvd_{th} = 4 << (mv_{precision} - 2)$$
$$\text{else if } (W \cdot H < 256) == > mvd_{th} = 4 << (mv_{precision} - 1)$$

where W and H are the width and height of the block, respectively, and the $mv_{precision}$ represents the precision of the motion vector (currently, 1/16 pixel precision is used in JEM).

Alternatively, the candidate motion vectors are first scaled to a frame such as the reference frame with reference index 0 in the current reference list. If the difference, such as in terms of L1 norm or L2 norm, between the scaled motion vectors is below or no larger than a threshold, the candidate motion vectors are regarded as same or similar.

Note that the calculation on similarity of motion vectors may be easily extened to the case of affine motion vectors or other non-translation motion vectors.

After this the first and third candidates in list L0 is pruned to check for similarity. If they are not identical third candidate is added to the list, otherwise not it is not added. This process is repeated until N non-similar candidates are selected from the list L0. If N non-similar candidates could not be selected from list L0, default candidates are added to the candidate list. The default candidate may be motion vector equal to (0,0) and reference index equal to the first picture in list L0. In another example, default candidate can be marked unavailable by setting reference index equal to 1. The above described process is carried out to select N non-similar candidates from the list L1.

After this step, 1) the TM is carried out for each of the N candidate and the best candidate is picked. In one example $mvd_{th}=0$. In another example, any scaled values of $mvd_{th}$ can be used for the similarity check. i.e., $c*mvd_{th}$, where c is a positive integer.

2) In another example for FRUC template matching with IC flag true, bi directional prediction could be skipped. In one example, only uni-directional prediction is allowed for a block with IC flag true. In another example, after uni-directional prediction for L0 and L1, MV0 and MV1 are derived. Then bi-directional motion search is skipped by using MV0 and MV1 directly to get the bi-directionally predicted template. The cost is calculated based on this predicted template, T0 and T1 for uni-/bi-directional decision.

In yet another example for FRUC template matching, it is proposed to move the uni-/bi-directional decision before the bi-directional template matching. That is the decision between uni-directional or bi-directional is done first followed by the bi-directional template matching.

In more details, cost0, cost1 and costBi are calculated as follows.

cost0: refers to the distortion between the current template $T_c$ and the matched template T0. The matched template $T_0$, is identified using the current template and the motion information in list L0 without refinement steps. cost1: refers to the distortion between the current template $T_c$ and the matched template $T_1$. The matched template $T_1$, is identified using the current template and the motion information in list L1 without refinement steps. costBi: refers to the bi-prediction cost, which is calculated as distortion between the current template $T_c$ and the average of the matched template $(T_1+T_0)/2$.

If costBi<factor*min(cost0, cost1) bi-prediction is carried out, otherwise uni-prediction is carried out using the list LX that has smallest cost. In JEM the factor is set to 1.1. The process is depicted in the following flow chart.

An advantage is that when uni-directional is found out to be the best choice, i.e., bi is converted to uni, (refer to the right side in the above flow chart) the refinement step is carried out for only one list L(i) and the computational cost associated with the refinement step for another list L(1−i) can be avoided at both the encoder and decoder.

Note that the costBi<factor*min(cost0, cost1) is one example to decide between the uni-directional and the bi-directional. However, the disclosed method can be applied even if other methods are used to decide between the two. Furthermore, in the flow chart, joint/bi-directional template matching is used for bi-prediction. Nevertheless, the disclosed method can be applied even if bi-directional template matching is not used for bi-prediction, e.g., two uni-predictors can be performed first and the results are combined/averaged for bi-prediction.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Figure 12:
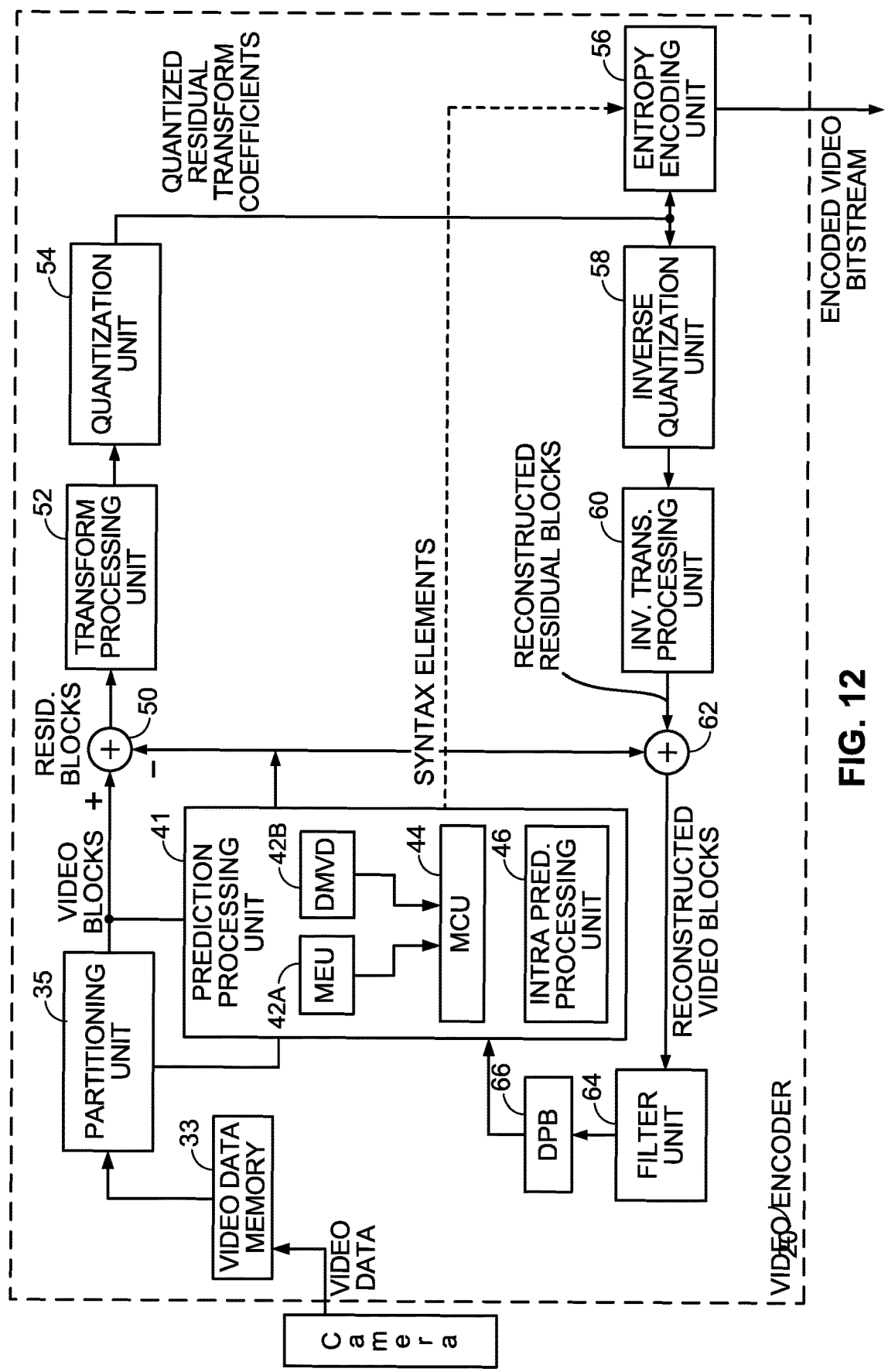
FIG. 12 illustrates an exemplary video encoder that may be used to implement one or more of the techniques described in this disclosure.

FIG. 12 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 12, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 12, video encoder 20 receives video data from a camera and stores the received video data along with metadata (e.g., Sequence Parameter Set (SPS) or Picture Parameter Set (PPS data) in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. For example, in a different embodiment, the partitioning unit 35 may generate the sequence parameter set (SPS) and/or picture parameter set (PPS). Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

The prediction processing unit 41 may be part of a processor which may be configured to generate a first prediction block for a block of a picture according to an intra-prediction mode, and generate a second prediction block for the block of the picture according to an inter-prediction mode. After the first and second prediction blocks are generated, the prediction processing unit 41 may be configured to propagate motion information to the first prediction block based upon motion information from the second prediction block and generate a final prediction block for the block of the picture based on a combination of the first and second prediction blocks. In an example, the first prediction block is used in the construction of a candidate list. In an AMVP mode, the candidate list may be a merging candidate list, or alternatively the candidate list may be an AMVP list.

In an example, the first prediction block and the second prediction block are neighboring blocks. In another example, the first prediction block and the second prediction block are spatially neighboring blocks. In another example, the first prediction block and the second prediction block are temporally neighboring blocks. In another example, the neighboring blocks are within the group of the same: slice, or tile or LCU or ROW or picture. In another example, the neighboring blocks are located in one or more previously coded frames. Moreover, the first prediction block inherits motion information from the second prediction block, and the relative position of the second prediction block with respect to the first prediction block is pre-defined. In addition, the second prediction block is selected from a plurality of neighboring blocks according to a predetermined rule.

Intra prediction unit 46 within prediction processing unit 41 may perform intra-predictive coding of the current video block relative to one or more neighboring blocks in the same frame or slice as the current block to be coded to provide spatial compression.

There is a motion estimation unit 42A and a decoder side motion derivation (DMVD) unit 42B. Both of these blocks in conjunction with motion compensation unit 44 within prediction processing unit 41 may perform inter-predictive coding of the current video block relative to one or more predictive blocks in one or more reference pictures to provide temporal compression.

Motion estimation unit 42A and DMVD 42B may be configured to determine the inter-prediction mode for a video slice according to a predetermined pattern for a video sequence. The predetermined pattern may designate video slices in the sequence as P slices or B slices. Motion estimation unit 42A and DMVD 42B and motion compensation unit 44 may be highly integrated, but are illustrated separately for conceptual purposes. Motion estimation, performed by motion estimation unit 42A, is the process of generating motion vectors, which estimate motion for video blocks. A motion vector, for example, may indicate the displacement of a PU of a video block within a current video frame or picture relative to a predictive block within a reference picture. In an AMVP mode, motion estimation unit 42A may generate motion vectors.

At the encoder side, the decision on which FRUC merge mode for a CU is based on rate distortion (RD) cost selection, as is done for normal merge candidate. That is, the two matching modes (bilateral matching and template matching) are both checked for a CU by using RD cost selection. The one leading to the minimal cost is further compared to other CU modes. If a FRUC mode is the most efficient one, FRUC flag is set to true for the CU and the related matching mode is used.

Local Illumination Compensation (LIC) is based on a linear model for illumination changes, using a scaling factor a and an offset b. And, it is enabled or disabled adaptively for each inter-mode coded coding unit (CU). When LIC applies for a CU, a least square error method is employed to derive the parameters a and b by using the neighbouring samples of the current CU and their corresponding reference samples. When a CU is coded with merge mode, the LIC flag is copied from neighbouring blocks, in a way similar to motion information copy in merge mode; otherwise, an LIC flag is signalled for the CU to indicate whether LIC applies or not.

In AMVP mode, the motion estimation unit 42A outputs a motion vector. In FRUC mode, the DMVD 42B outputs the motion vector. In this disclosure, the motion compensation unit 44 may decide which motion vector is better to use based on comparing the output of the motion estimation unit 42A and the decoder side motion vector derivation 42B.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42A may perform a motion search relative to the full pixel positions and fractional pixel positions and output a motion vector with fractional pixel precision.

Motion estimation unit 42A calculates a motion vector for a PU of a video block in an inter-coded slice by comparing the position of the PU to the position of a predictive block of a reference picture.

The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 13:
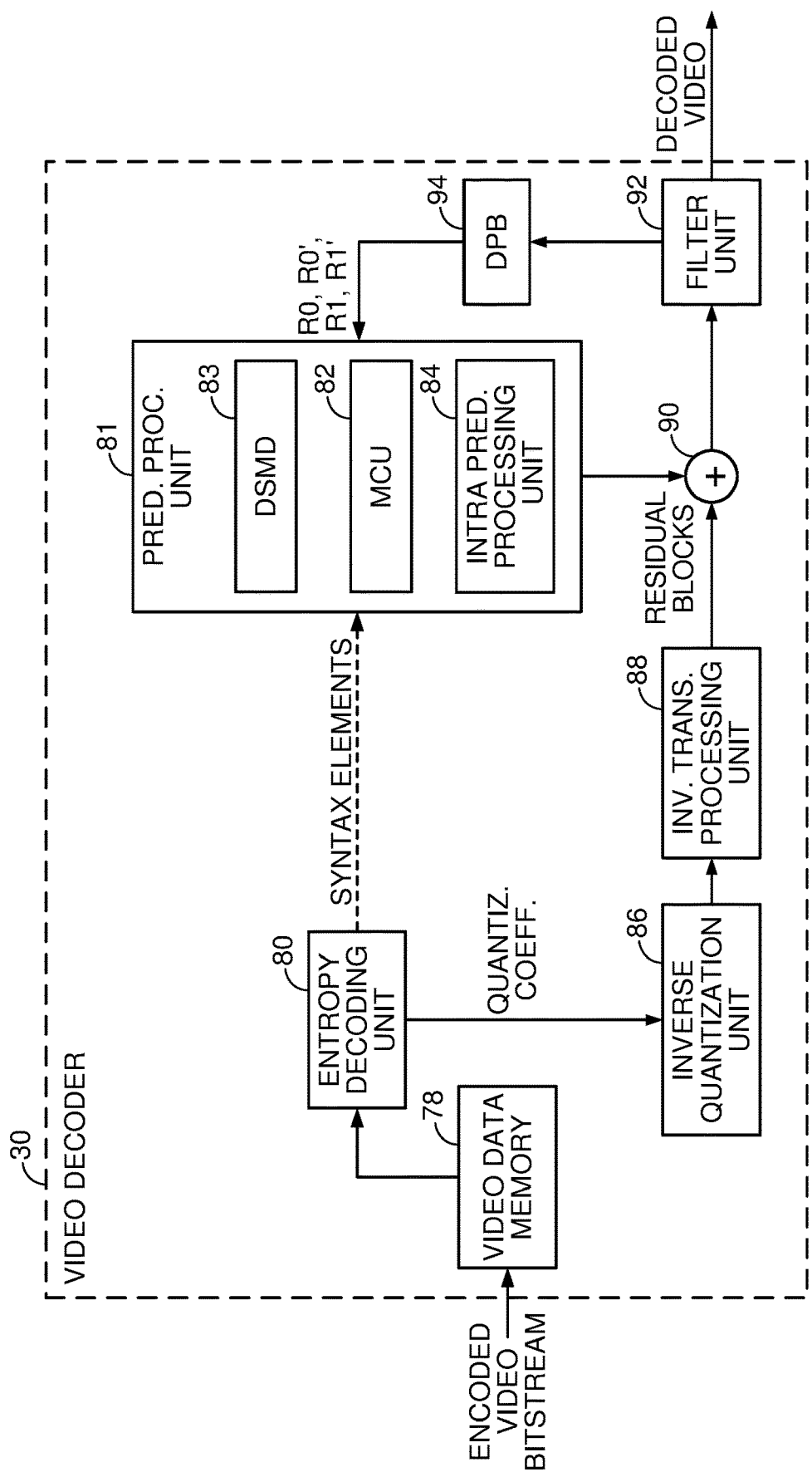
FIG. 13 illustrates an exemplary video decoder that may be used to implement one or more of the techniques described in this disclosure.

FIG. 13 is a block diagram illustrating an example video decoder 30 that may implement the techniques described in this disclosure. Video decoder 30 of FIG. 8 may, for example, be configured to receive the signaling described above with respect to video encoder 20 of FIG. 12. In the example of FIG. 12, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces a final generated predictive blocks for a video block of the current video slice based on the motion vectors and other syntax elements received from entropy decoding unit 80. The final generated predictive blocks may be produced from one of the reference pictures within one of the reference picture lists. The prediction processing unit 81 may be part of a processor which may be configured to reconstruct a first prediction block for a block of a picture according to an intra-prediction mode, and reconstruct a second prediction block for the block of the picture according to an inter-prediction mode. After the first and second prediction blocks are generated, the prediction processing unit 81 may be configured to propagate motion information to the first generated prediction block based upon motion information from the generated second prediction block and generate a final generated prediction block for the block of the picture based on a combination of the first and second prediction blocks. In an example, the first generated prediction block is used in the construction of a candidate list. The candidate list may be a merging candidate list, or alternatively the candidate list may be an AMVP list.

In an example, the first prediction block and the second prediction block are neighboring blocks. In another example, the first prediction block and the second prediction block are spatially neighboring blocks. In another example, the first prediction block and the second prediction block are temporally neighboring blocks. In another example, the neighboring blocks are within the group of the same: slice, or tile or LCU or ROW or picture. In another example, the neighboring blocks are located in one or more previously coded frames. Moreover, the first prediction block inherits motion information from the second prediction block, and the relative position of the second prediction block with respect to the first prediction block is pre-defined. In addition, the second prediction block is selected from a plurality of neighboring blocks according to a predetermined rule.

Video decoder 30 may construct the reference frame lists, List 0 and List 1, using default construction techniques based on reference pictures stored in DPB 94.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After the prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Using techniques in this disclosure of template matching, the Decode side Motion Vector Derivation (DMVD) 83 may use template matching techniques in a FRUC mode to select a number of template matching (TM) candidates based on a temporal layer or slice, wherein the number of TM candidates selected for a given temporal layer or slice can be selectively fixed prior to the video decoding, or adaptively calculated on the fly (i.e., in real time) during the video decoding. And explicitly signal a number of allowed TM candidates for a given temporal layer or slice at the slice header or SPS or PPS.

In a frame rate up-conversion (FRUC) mode, DMVD may generate motion vectors. FRUC mode is a special merge mode, with which motion information of a block is not signaled but derived at the decoder side. As was previously described, a FRUC flag is signalled for a CU when its merge flag is true. When the FRUC flag is false, a merge index is signaled and the regular merge mode is used. When the FRUC flag is true, an additional FRUC mode flag is signalled to indicate which method (bilateral matching or template matching) is to be used to derive motion information for the block. During the motion derivation process, an initial motion vector is first derived for the whole CU based on bilateral matching or template matching. First, the merge list of the CU is checked and the candidate which leads to the minimum matching cost is selected as the starting point. Then, a local search based on bilateral matching or template matching around the starting point is performed and the MV results in the minimum matching cost is taken as the MV for the whole CU. Subsequently, the motion information is further refined at sub-block level with the derived CU motion vectors as the starting points.

The DMVD 83 may adaptively calculate the number of template matching candidates based on a history of motion vectors from a previous frame. In other instances, the DMVD may use a default number of template matching candidates.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code, or instructions may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold devices." A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes a video device. Other examples may be inferred from the context disclosed herein, including this paragraph, when using the term "integrated".

As used herein "a wireless" connection between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B," or "A or B," or both "A and B" and "A or B" are applicable or acceptable.

As used herein, a unit can include, for example, a special purpose hardwired circuitry, software and/or firmware in conjunction with programmable circuitry, or a combination thereof.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

Various examples have been described. These and other examples are within the scope of the following claims.

What is claimed is:

1. A device for video decoding, the device comprising:
a memory configured to store reconstructed video data;
a processor configured to:
receive a bitstream including encoded video data;
determine a number of motion vectors, from one or more neighboring blocks of a current block in a current picture, that point to one or more blocks in a first reference picture, or that point to one or more blocks in a second reference picture, or that point to one or more blocks in a first reference picture and a second reference picture;
select a number of template matching (TM) candidates, from the motion vectors from the neighboring blocks of the current block of the current picture, for a temporal layer or slice during the video decoding, wherein the number of TM candidates selected are adaptively calculated during the video decoding based on (a) rates of change of horizontal components and vertical components of a plurality of motion vectors between a block in a first reference picture and the current block in the current picture, and (b) deviating from the determined number of motion vectors from the one or more neighboring blocks of the current block in the current picture; and
derive a motion vector of the current block based on the selected number of template matching candidates that were adaptively calculated to generate a prediction block based on the derived motion vector, to reconstruct the video data based on the prediction block and a residual block.

2. The device of claim 1, wherein the bitstream also includes a syntax element representing the number of template matching candidates for the temporal layer or slice.

3. The device of claim 1, wherein reconstructed video data is used to determine the template matching candidates for the temporal layer or slice.

4. The device of claim 1, wherein the adaptively calculated the selected number of the template matching candidates are based on a history of motion vectors from a previous frame.

5. The device of claim 1, wherein the selected number of TM candidates are adaptively calculated when the number of TM candidates is larger for a lower temporal layer when compared to the number of TM candidates in a higher temporal layer.

6. The device of claim of 5 wherein the number of TM candidates is determined based on the temporal layer and not explicitly signaled using an additional syntax element.

7. The device of claim 1, wherein the number of TM candidates selected for the temporal layer or slice is received in a slice header, sequence parameter set (SPS), picture parameter set (PPS) as part of the bitstream.

8. The device of claim 1, wherein the number of TM candidates selected are applied only when an Illumination Compensation (IC) flag is off for a coding unit (CU).

9. The device of claim 8, wherein the number of TM candidates selected for the temporal layer or slice are applied only when IC flag is off for the CU.

10. The device of claim 1, wherein a frame rate up conversion search is based on a size of the template to perform the search.

11. The device of claim 10, wherein an edge-preserving denoise filter is applied for the current, L0, and L1 template before the search is performed.

12. The device of claim 10, wherein when the size of the template associated with the template candidate exceeds a threshold T, Mean-Removed Sum of Absolute Difference (MR-SAD), Normalized Cross Correlation (NCC) is used to find the closest motion vector during the search, otherwise, a regular metric of Sum of Squared Difference (SSD) is used to find the closest motion vector during the search.

13. The device of claim 12, wherein the threshold is pre-defined or received in a sequence parameter set, picture parameter set, or a slice header that is part of the bitstream.

14. A method of video decoding, comprising:
receiving a bitstream including encoded video data;
determining a number of motion vectors, from one or more neighboring blocks of a current block in a current picture, that point to one or more blocks in a first reference picture, or that point to one or more blocks in a second reference picture, or that point to one or more blocks in a first reference picture and a second reference picture;
selecting a number of template matching (TM) candidates, from the motion vectors from the neighboring blocks of the current block of the current picture, for a temporal layer or slice during the video decoding, wherein the number of TM candidates selected are adaptively calculated during the video decoding based on (a) rates of change of horizontal components and vertical components of a plurality of motion vectors between a block in a first reference picture and the current block in the current picture, and (b) deviating from the determined number of motion vectors from the one or more neighboring blocks of the current block in the current picture; and
deriving a motion vector of the current block based on the selected number of template matching candidates that were adaptively calculated to generate a prediction block based on the derived motion vector, to reconstruct the video data based on the prediction block and a residual block.

15. The method of claim 14, wherein the bitstream also includes a syntax element representing the number of template matching candidates for the temporal layer or slice.

16. The method of claim 14, wherein the adaptively calculated template matching candidates are based on a history of motion vectors from a previous frame.

17. The method of claim 14, wherein the number of TM candidates selected are larger for a lower temporal layer when compared to a higher temporal layer.

18. A device for video encoding, the device comprising:
a memory configured to store video data;
a processor configured to:
  determine a number of motion vectors, from one or more neighboring blocks of a current block in a current picture, that point to one or more blocks in a first reference picture, or that point to one or more blocks in a second reference picture, or that point to one or more blocks in a first reference picture and a second reference picture;
  select a number of template matching (TM) candidates based on a temporal layer or slice, wherein the number of TM candidates selected, for a the temporal layer or slice, are adaptively calculated during the video encoding;
  select a number of template matching (TM) candidates, from the motion vectors from the neighboring blocks of the current block of the current picture, for a temporal layer or slice during video encoding, wherein the number of TM candidates selected are adaptively calculated during the video encoding based on (a) rates of change of horizontal components and vertical components of a plurality of motion vectors between a block in a first reference picture and the current block in the current picture, and (b)
  deviating from the determined number of motion vectors from the one or more neighboring blocks of the current block in the current picture; and
  signal a number of allowed TM candidates based on the selected number of template matching candidates that were adaptively calculated, for a temporal layer or slice, in the slice header, sequence parameter set (SPS), or picture parameter set (PPS).

* * * * *